United States Patent [19]
Holman

[11] 3,866,529
[45] Feb. 18, 1975

[54] DENSITY CONTROL FOR HAY BALERS
[76] Inventor: Owen F. Holman, P.O. Box 993, Corpus Christi, Tex. 77703
[22] Filed: Aug. 14, 1972
[21] Appl. No.: 280,173

[52] U.S. Cl.................................. 100/43, 100/192
[51] Int. Cl...................... B65b 13/18, B30b 1/00
[58] Field of Search ........ 100/43, DIG. 8, 147, 148, 100/191, 192

[56] References Cited
UNITED STATES PATENTS

| | | | |
|---|---|---|---|
| 2,576,784 | 11/1951 | Dodds et al............................ | 100/43 |
| 2,582,672 | 1/1952 | Bobst.................................. | 100/43 |
| 2,613,590 | 10/1952 | Graybill.............................. | 100/43 |
| 2,708,872 | 5/1955 | Lauck................................. | 100/43 |
| 2,722,884 | 11/1955 | Seltzer............................... | 100/192 |
| 2,763,201 | 9/1956 | Hauswirth........................... | 100/43 |
| 3,070,006 | 12/1962 | Raney et al........................ | 100/192 |
| 3,424,081 | 1/1969 | Hoke.................................. | 100/192 |

*Primary Examiner*—Billy J. Wilhite
*Attorney, Agent, or Firm*—G. Turner Moller

[57] ABSTRACT

There is disclosed a hay baler and a density control therefor to automatically maintain the density of bales relatively uniform. The force of a relatively constant gaseous pressure source is applied to the conventional movable chute wall.

9 Claims, 5 Drawing Figures

DENSITY CONTROL FOR HAY BALERS

BACKGROUND OF THE INVENTION

This invention relates to hay balers and more particularly to an improved device for automatically maintaining bale density relatively constant.

It is well known in the art that, without special provisions, bales produced by hay baling machines vary in density in response to varying moisture content and hay quality. It is well known that it is desirable to produce bales of uniform density. Where the density of bales is too great, the string or wire used to tie the bales tends to break. If the density is too low, the bale is loose and tends to fall apart. Thus when bale density is out of a predetermined range, one obtains hay that is not readily handled nor readily saleable.

This problem is old and widely recognized. Many solutions have been proposed for resolving this difficulty as evidenced by U.S. Pat. Nos. 2,582,672; 2,708,872; 2,758,536 and a brochure of the Massey-Ferguson Company entitled Owners Manual, MF12 Baler. These approaches appear to fall into two categories: (1) providing a sensor to detect hay density in the delivery chute and controlling a force applied to the movable chute wall in response to a signal from the sensor; and (2) requiring the baler operator to detect changes in bale density and requiring the operator to control a force applied to the movable chute wall. Devices of the first category may properly be termed "automatic" since no human intervention is required for satisfactory operation while devices of the second category may properly be termed "manual" even though the operator controls the force through mechanical, hydraulic, pneumatic or electrical means.

A typical hay baling operation commences in late morning after a substantial part of the moisture on the hay has been evaporated by solar energy. The moisture content of hay at the beginning of baling operations is normally quite high. In order to assure that bales produced at the commencement of baling operations is within the satisfactory range, the delivery chute is normally made relatively large, either by automatically or manually retracting the movable wall from the chute. As baling proceeds during the day, the hay dries out and the delivery chute is made smaller, either automatically or manually, so that the finished bale is of approximately the same density as those which were processed earlier.

Density control devices known in the prior art have major disadvantages. In the automatic category, the devices tend to be unduly complex and accordingly expensive, are subject to malfunction and require substantial maintenance. In the manual category, all the devices require operator attention and are subject to the wandering of human concentration and attention. The manual devices which are relatively simple, inexpensive, not subject to malfunction and which require little maintenance have the unfortunate disadvantage that the operator must climb down from the tractor, walk to the baling chute and make manual adjustments at the chute itself. It will be appreciated that this is aggravating to the operator and naturally conduces toward adjustment of the movable chute wall long after such adjustments were actually required or desirable. Some of the manually adjustable density control devices, such as shown in the Massey-Ferguson brochure, allow adjustment of the movable chute wall by the operator from the operator's tractor position. Although the operator need not leave the tractor position to make the desired adjustments, such devices still require his attention and tend to be somewhat complex with all of the disadvantages attendant thereto.

The density control device of this invention falls into the automatic category not requiring human intervention. The device of this invention is characterized by marked simplicity and accordingly is less expensive than all but the simplest manual devices, requires no maintenance, has a long useful life, and is not subject to malfunction.

Of more general interest are the disclosures in U.S. Pat. Nos. 2,567,151 and 3,070,006.

SUMMARY OF THE INVENTION

It is an object of this invention to provide a hay baling machine and an automatic bale density control therefor which is characterized by being inexpensive, requiring little or no maintenance, having long useful life and not being subject to malfunction.

Another object of the invention is to provide a hay baling machine and an automatic bale density control therefor utilizing a relatively constant gaseouos pressure source applying a force to the conventional movable discharge chute wall of the hay baling machine.

In summary, one aspect of this invention comprises a hay baling machine including a chute having at least one wall movably mounted for adjusting the density of bales passing therethrough, means for forcing hay into the chute, and means for automatically adjusting the position of the movable wall for maintaining the density of the bales relatively uniform including a fluid motor driveably connected to the movable wall, a source of relatively constant gaseous pressure and means placing the source in constant communication with the fluid operated motor during baling operations.

Another aspect of this invention comprises a process for baling hay using a mobile hay baling machine of the type having a hay gatherer, a hay compactor, a chute in hay receiving relation to the compactor including at least one wall mounted for movement into a convergent relation to the chute discharge end and means for tying the bales, the process comprising the steps of advancing the mobile baling machine through a field for gathering hay thereon, compressing the hay into a bale, tying the bale and maintaining the density of the bale substantially uniform including the steps of providing a vessel containing pressurized gas, and constantly and solely applying an unregulated force of the pressurized gas to the movable wall.

DETAILED DESCRIPTION OF THE PREFERRED EMBODIMENT

Figure 1:
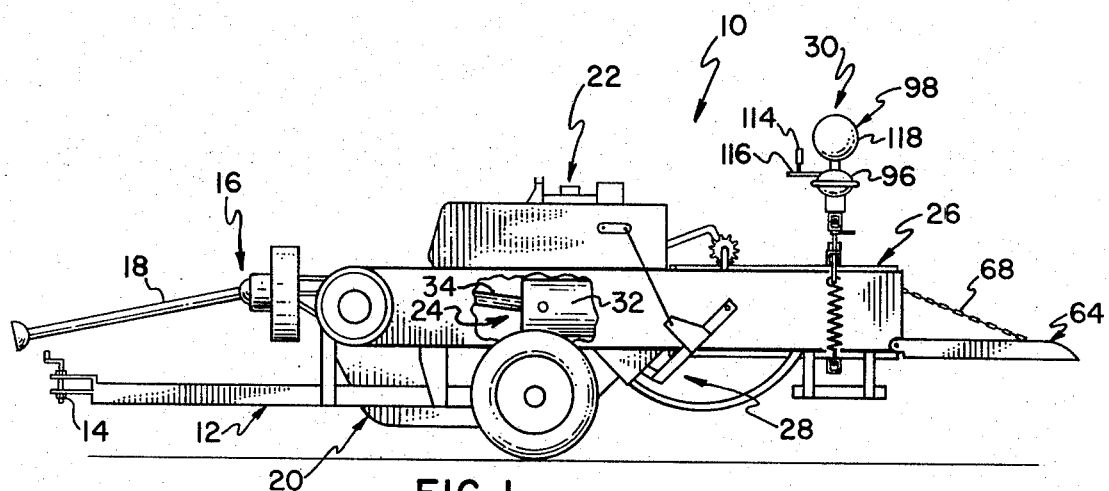
FIG. 1 is a side elevational view of a typical hay baling machine equipped with the density control device of this invention.

Referring to FIG. 1, there is illustrated a typical mobile hay baling machine 10 comprising, as major components, a wheeled frame 12 providing a hitch 14 for connection to a suitable tractor (not shown), a drive mechanism 16 connected by a power take-off shaft 18 to the tractor for powering the baling machine 10, a hay gathering mechanism 20 which delivers hay to a cutting mechanism 22, a hay compactor 24 which receives hay from the cutter 22 and forces the same through a chute 26 and a bale tying mechanism 28. Positioned adjacent the discharge end of the chute 26 is an automatic density control device 30 of this invention.

Figure 4:
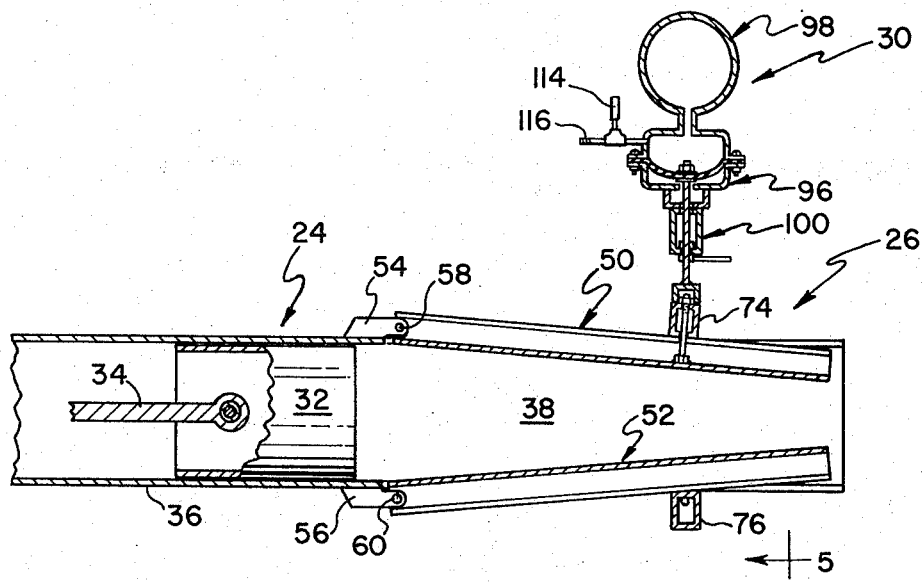
FIG. 4 is a view similar to FIG. 3 illustrating the baling of relatively dry hay.
Figure 3:
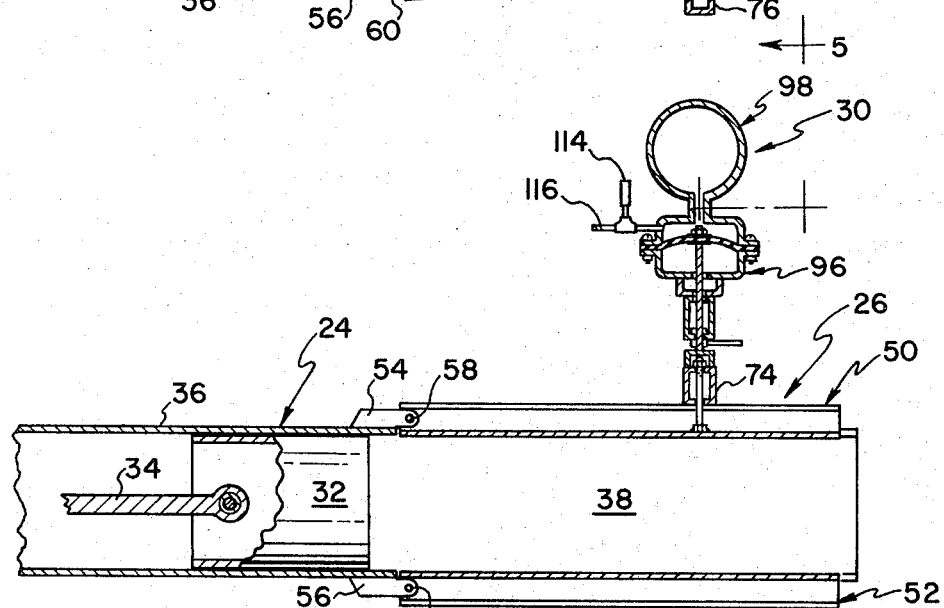
FIG. 3 is a longitudinal cross sectional view of the discharge chute illustrating the baling of relatively moist hay.
Figure 5:
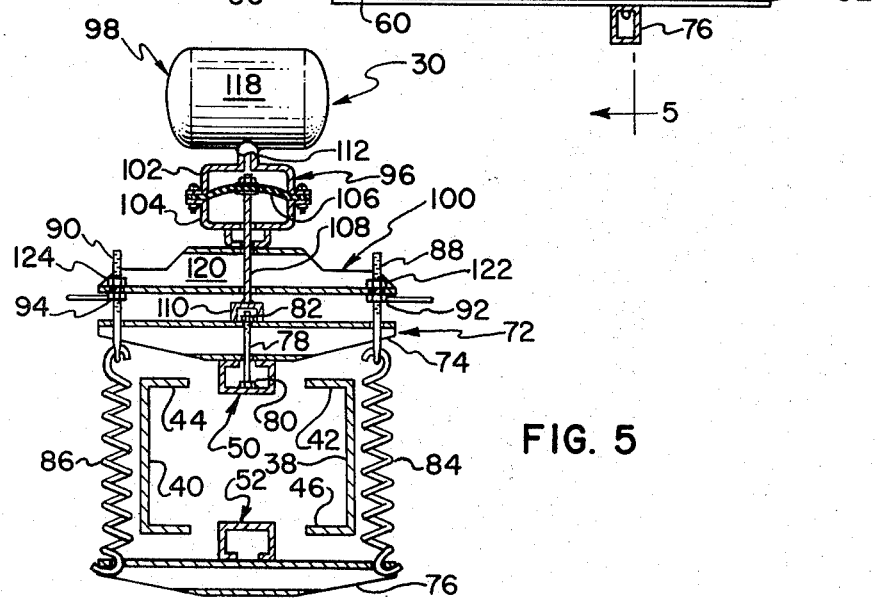
FIG. 5 is a transverse cross sectional view of the chute discharge end as taken along line 5—5 of FIG. 3.

Referring to FIGS. 3 and 4, the hay compactor 24 is illustrated as a piston 32 pivotally connected to a link 34 which may be driven from the power take-off 16 by any suitable mechanism, for example a crank. The piston 32 reciprocates in a housing 36 which is in hay receiving relation to the cutter 22. The piston 32 basically acts to crowd the hay passing from the cutter 22 against the restriction afforded by the chute 26. As is well known in the prior art, increasing the restrictions afforded by the chute 26 acts to increase the density of the bales produced by the baling machine 10 if all other factors remain constant.

Figure 2:
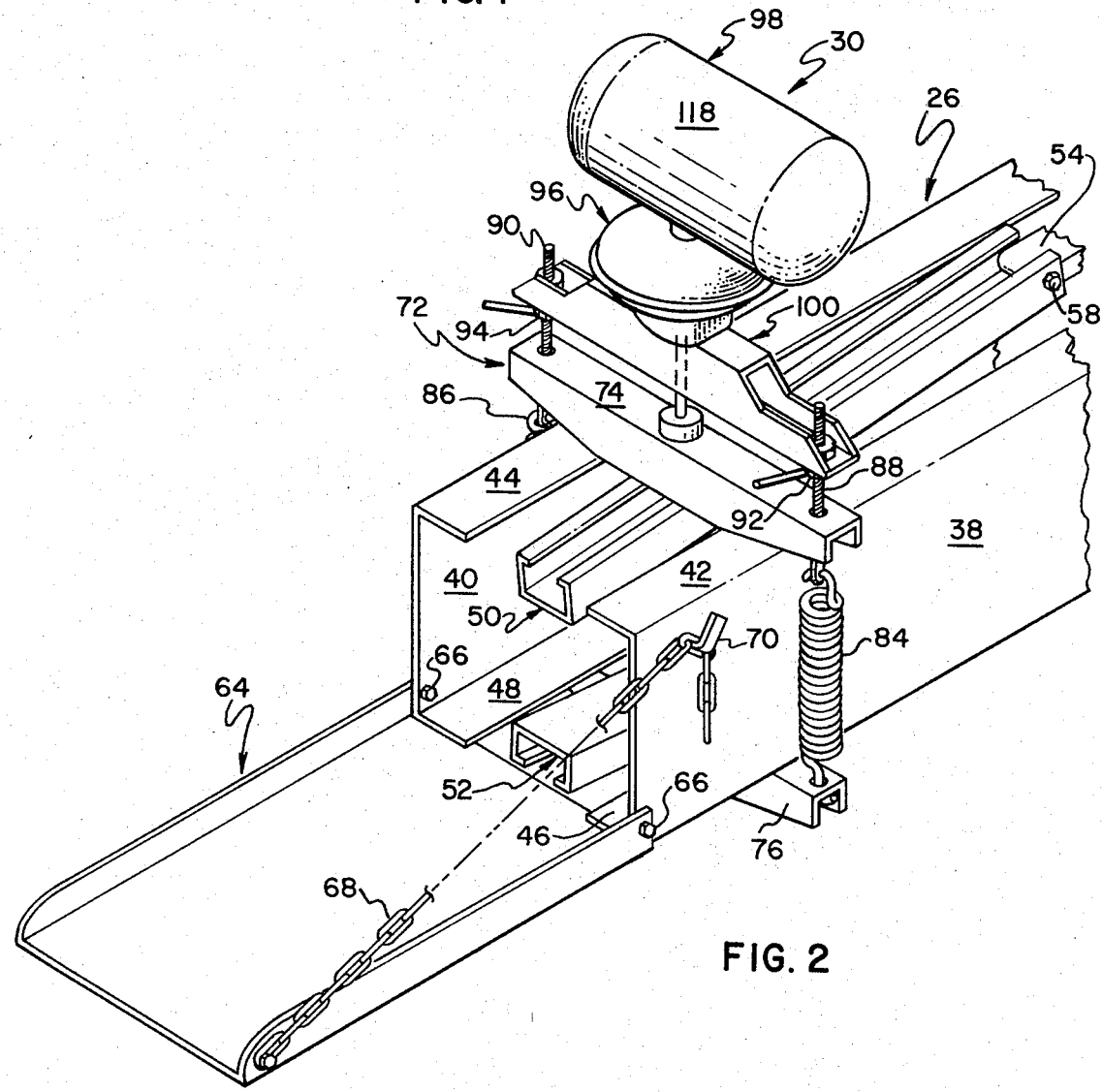
FIG. 2 is an isometric view of the discharge chute of the baling machine of FIG. 1.

Referring to FIGS. 2–5, the chute 26 comprises stationary sidewalls 38, 40. The typical chute includes stationary as well as movable top and bottom wall portions. To this end, the sidewalls 38, 40 include inwardly projecting top segments 42, 44 and inwardly projecting bottom segments 46, 48 respectively. Completing the periphery of the chute 26 are a pair of opposed movable top and bottom walls or rails 50, 52 respectively. The movable top and bottom walls 50, 52 are typically C-shaped in cross section. The movable top and bottom walls are mounted by brackets 54, 56 and pins 58, 60 respectively for pivotal movement about fixed spaced axes. As shown in FIGS. 1 and 2, a chute extension 04 is positioned downstream of the chute 26. The chute extension 64 is conveniently pivoted to the stationary chute walls 38, 40 by suitable pins 66 and held in position by a suitable stop mechanism such as a chain 68 acting between the free end of the chute extension 64 and a bracket 70.

As heretofore described, the baling machine 10 has been illustrated as a conventional Massey-Ferguson Model $MF_{12}$ machine. For a more complete understanding of this type machine, reference is made to the Massey-Ferguson publication entitled Owners Manual, MF12 Baler. Included as an attachment on this particular machine is a manual bale density regulator 72. The conventional bale density regulator 72 comprises upper and lower transverse beams 74, 76 respectively connected to the upper and lower movable wall segments or rails 50, 52. Conventionally, the lower transverse beam 76 is welded to the rail 52 while the upper transverse beam 74 is connected to the upper rail 50 by a threaded connection 78. The threaded connection 78 typically includes a screw 80 secured at the lower end to the rail 50 and provided with a nut 82 for captivating the beam 74 to the rail 50.

The transverse beams 74, 76 are interconnected by suitable tension springs 84, 86 which force the rails 50, 52 toward each other to provide the resistance for hay passing through the chute 26. As shown best in FIGS. 2 and 5, the connection between the springs 84, 86 and the upper transverse beam 74 is through a threaded connection 88, 90 and suitable wing nuts 92, 94 respectively.

In the operation of the conventional hay baling machine 10, the operator backs off the nuts 92, 94 at the start of baling operations so that the restriction afforded by the chute 26 is at a minimum. The bales produced tend to be quite dense because of moisture on the hay. As baling operations continue throughout the day and the hay dries out, the bales become too loose. the operator must stop the tractor, proceed to the rear of the baling machine 10, and tighten down on the wing nuts 92, 94 to increase the resistance afforded by the movable rails 50, 52. Typically, the operator must tighten down on the nuts 92, 94 a number of times during a day's baling operations. It will be appreciated that baling machine operators tend to wait too long between adjusting the nuts 92, 94 thereby obtaining loose bales that will fall apart during handling.

It should be noted that the moisture content of hay in the field is not strictly a question of the time of the day. It will be appreciated that the evaporation rate may vary widely from one day to the next because of temperature, relative humidity, cloud cover and the like. It will be evident that the day-to-day variations in moisture content is not a serious problem with the manual density control device 72 since the only effect is the number of times that the operator must get down from the tractor.

A serious short term problem resides in variation of hay quality and moisture content in a given field at the same time of the day. Moisture content often varies depending upon the elevation of the ground. Quite often it occurs that hay lying in a swale or low area will have a higher moisture content than hay on a knoll or raised spot because of the difference in ground moisture between these two locations. Similarly, a shaded area in a field will almost invariably produce hay of higher moisture content than an unshaded area. Manual density controls of the type requiring the operator to dismount from the tractor utterly fail to meet this type density variation since it is impractical for the operator to dismount frequently. Manual density controls of the type allowing the operator to adjust bale density from a tractor are better but still undesirable since it requires a very alert operator to make adjustments properly. To a large extent, the development of automatic density controls is due to this type variation as well as the desirability of eliminating human error.

The particular density control device 30 illustrated in the drawings was designed to be quickly and conveniently installed on the particular hay baler 10 illustrated. It will be apparent that the principles of the density control device 30 may be applied to hay baling machines having chutes of different configuration in which the movable rails present different physical shapes to the automatic density control device of this invention.

As mentioned previously, the density control device 30 of this invention is characterized by marked simplicity which results in an inexpensively manufactured mechanism, automatic operation not requiring human intervention, a long useful life and minimal maintenance requirements. The density control device 30 has only three major components: a fluid motor 96, a source 98 of relatively constant gaseous pressure and means 100 for attaching the device 30 in operative connection with at least one of the movable rails 50, 52.

The fluid motor 96 is illustrated as a diaphragm type gas operated motor having a member providing a linear output of substantial length. The fluid motor 96 conveniently includes upper and lower housing sections 102, 104 captivating therebetween a diaphragm 106 to which is attached a reciprocable output rod 108. Attached to the bottom of the output rod 108 is a cup-shaped member 110 which is received over the nut 82 providing a drive connection for forcing the upper rail 74 away from the motor 96. The motor 96 also includes an inlet 112 for power fluid from the source 98. A pressure gauge 114 and a filling valve 116 are conveniently connected to the upper motor housing 102 such that the gauge 114 faces toward the operator's tractor position for ready visibility. The filling valve 116 is preferably an automotive tire valve allowing the operator to connect a conventional tire pump or air source thereto for charging the source 98.

The source 98 comprises a pressure vessel 118 of any suitable configuration which is designed to hold at least a moderate amount of gaseous pressure. In a prototype of the invention, the vessel 118 was of generally cylindrical shape having a volume of about 0.4 cubic feet. The overall capacity of the vessel 118 and the upper housing 102 in the prototype is estimated at about 0.6 cubic feet. Conveniently the fluid inlet 112 for the motor 96 comprises the support for the vessel 118.

The lower motor housing 104 is secured, as by welding or the like to the attaching means 100 which conveniently comprises a transverse beam 120. The beam 120 is provided with suitable apertures for receiving the existing threaded connections 88, 90 afforded by the conventional manual density control device 72. Suitable nuts 122, 124 are provided on the upper end of the threaded connections 88, 90.

To install the density control device 30 of this invention on the conventional manual density control device 72 provided by the baler 10 is quite simple. The wing nuts 92, 94 are backed off out of engagement with the rail 74 toward the position illustrated in FIG. 5. The density control device 30 is then placed on top of the beam 74 such that the threaded connections 88, 90 pass through the openings in the beam 120. The nuts 122, 124 are tightened until the beam 120 is rigid with the threaded connections 88, 90. The operator charges the vessel 118 by attaching a conventional tire pump or automotive air source to the filling valve 116 and charges the vessel 118. In the prototype previously mentioned, the vessel 118 was charged with about 55 psig air. The motor 96 of the prototype comprised an air brake motor from a large truck and is about 8 inches in overall diameter providing a linear output travel of about 3½ inches. After installing the prototype on a Massey-Ferguson MF12 baler in accordance with FIG. 5, baling operations commenced. After some experimentation at the start of baling operations, the pressure in the vessel 118 was bled off to about 53 psig. During this experimentation, the bales were slightly too dense thereby indicating to the operator that pressure in the vessel 118 needed to be bled off. If the bales had been slightly too loose at the inception of baling operation, the operator would have charged the vessel 118 with additional pressurized air. After the setting of 53 psig was obtained, baling operations continued throughout the day without again changing pressure in the vessel 118.

FIG. 3 illustrates the configuration of the chute 26 and the density control device 30 during the early part of baling operations while the hay being processed was relatively damp. As the hay dried out during the day, the force applied by the motor 96 was capable of restricting the chute 26 by placing the rails 50, 52 in converging relation as shown in FIG. 4.

As mentioned previously, one exasperating problem resides in localized damp hay such as may be found in a shaded are or in a swale. As the baling machine 10 passed into such an area, the rails 50, 52 opened up and bales were produced of comparable density to that previously baled. As the baling machine 10 moved out of the localized damp area, the rails 50, 52 again assumed the more restricted position illustrated in FIG. 4. It was accordingly apparent that the density control device 30 accommodated relatively rapid fluctuating hay conditions to produce bales of relatively uniform density without human intervention.

In the automatic density control devices of the prior art, there has customarily been provided a sensing member forced against hay passing through the chute and a separate movable member, comparable to the rails 50, 52 providing the restriction afforded by the chute. One feature of this invention which contributes to its simplicity is that the rails 50, 52 act to sense the density of hay passing therethrough as well as act as the restriction device. When hay in the chute 26 is relatively moist, as in FIG. 3, the force applied to the rails 50, 52 by the fluid motor 96 cannot substantially compress the hay. When hay in the chute 26 is relatively dry, the rails 50, 52 can compress the hay in the chute 26, as in FIG. 4. It will accordingly be seen that the rails 50, 52 provide a sensing function for hay density.

As previously mentioned, the density control device 30 has only three major components. It should be apparent that the attaching means 100 may vary somewhat depending on the chute configuration of the baler to which the device 30 is attached. The requirements of the motor 96 and the source 98 are somewhat interrelated. The motor 96 should provide sufficient movement of the rod 108 to move the rails 50, 52 the distance required by the configuration of the particular chute with which it is used. Thus, the required travel of the motor 96 may vary although a travel of about 2–10 inches would appear to be satisfactory for almost any application.

The vessel 118 should be sufficiently large to hold enough pressurized gas to avoid substantial fluctuations in pressure between the retracted and extended positions of the motor 96. Obviously, as one selects larger and larger tanks, the pressure variation in the vessel 118 will decrease. Pressure vessels of the size used in the prototype have proved quite satisfactory although it should be noted that one typical environmental factor helps maintain pressure in the vessel 118 relatively constant. As previously mentioned, the motor 96 is extended toward the position of FIG. 4 as baling operations continue throughout the day. One should accordingly expect to see a pressure drop in the vessel 118. Such pressure drops are barely discernible on a conventional gauge. Since air temperature normally rises as the day proceeds, atmospheric warming of the vessel 118 and the gas contained therein partially offsets the pressure decrease which would be experienced by extension of the output rod 108.

The motor 96 may be of any desirable size although a relatively large diameter motor allows the use of a moderate pressure in the vessel 118. It will be apparent that a motor of substantially smaller diameter is operable provided the pressure in the vessel 118 is substantially higher to produce a comparable force acting on the rails 50, 52.

I claim:

1. A hay baling machine comprising
   a chute having a stationary frame and at least one wall mounted adjacent one end thereof on the frame for simple pivotal movement relative thereto for adjusting the density of hay material passing through the chute;
   a mechanically driven plunger for forcing hay into one end of the chute; and
   means, independent of the mechanically driven plunger, for automatically adjusting the position of the movable wall wholly in response to the compaction of material in the chute for maintaining the density of the bales relatively uniform, the adjusting means comprising
   a fluid motor drivably connected to the movable wall;
   a source of relatively constant gaseous pressure;
   means placing the source in constant communication with the fluid motor during baling operations;
   means for filling the pressure source including a conduit having an end open to the atmosphere and a valve in the conduit for holding pressure in the source; and
   a pressure gauge in communication with the source.

2. The hay baling machine of claim 1 wherein the valve comprises a tire valve.

3. The hay baling machine of claim 1 wherein the source is supported on the motor.

4. A hay baling machine comprising
   a chute having a stationary frame, a discharge end and a pair of opposed movable walls mounted remote from the discharge end for pivotal movement into coverging relation toward the discharge end for adjusting the density of hay material passing through the chute;
   means for forcing hay through the chute toward the discharge end; and
   means for automatically adjusting the position of the movable walls wholly in response to the compaction of material in the chute for maintaining the density of the bales relatively uniform, the adjusting means comprising
   a first member transverse to the chute extending beyond the width thereof on both sides;
   a single fluid motor supported on the first member and having an output member in driving relation to one of the pivotal walls;
   a second member, transverse to the chute extending beyond the width thereof on both sides, attached to the other pivotal wall;
   means connecting the first and second members together outside the confines of the chute and on opposite sides thereof for transmitting extension of the output member into converging movement of the walls;
   a source of relatively constant gaseous pressure; and
   means placing the source in constant communication with the fluid motor during baling operations.

5. The hay baling machine of claim 4 wherein the motor is mounted along a centerline of the chute.

6. The hay baling machine of claim 5 further comprising an articulated connection between the output member and the one movable wall.

7. The hay baling machine of claim 4 wherein the connecting means comprise springs.

8. A device for converting a hay baler of the type having a manual hay density controller to the type having an automatic hay density controller, the manual density controller including a chute having first and second opposed pivotally mounted walls, first and second members attached to the first and second walls respectively and extending beyond the confines of the chute, a pair of springs attached to the first and second members outside the confines of the chute and means for manually varying the tension in the springs, the device comprising
   a third member wider than the chute;
   a fluid motor, supported on the third member, including an output member having an end for connection to the first member;
   means for connecting the third member to the first member;
   a source of relatively constant gaseous pressure supported by the third member; and
   means placing the source in constant communication with the fluid motor.

9. The hay baling machine of claim 8 wherein the source is supported by the fluid motor.

* * * * *